Sept. 22, 1931.  R. P. YOUNG  1,824,319
HANDLE FOR WOODEN BASKETS
Filed April 23, 1927  2 Sheets-Sheet 1
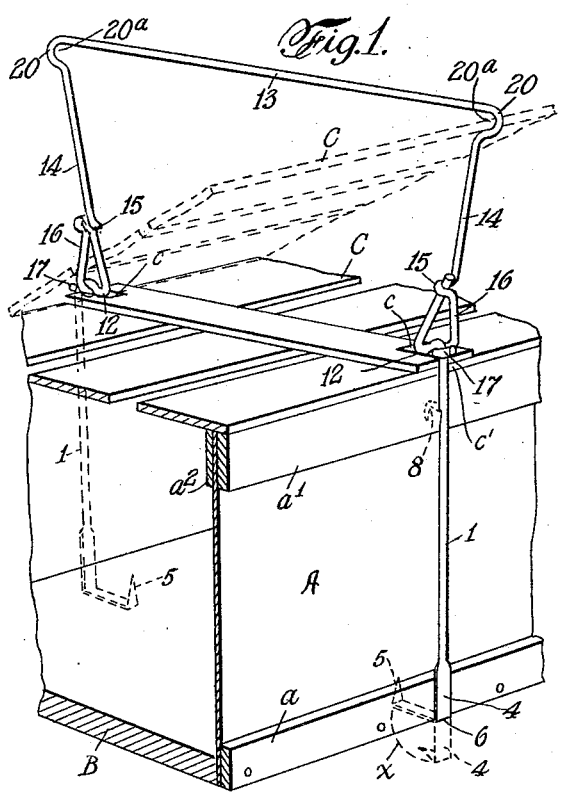
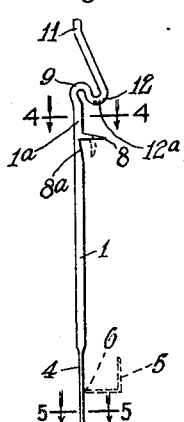
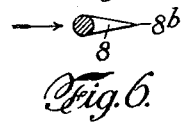
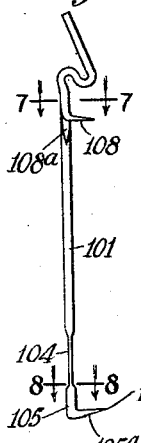
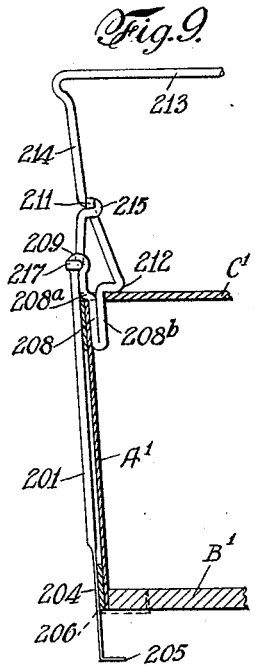
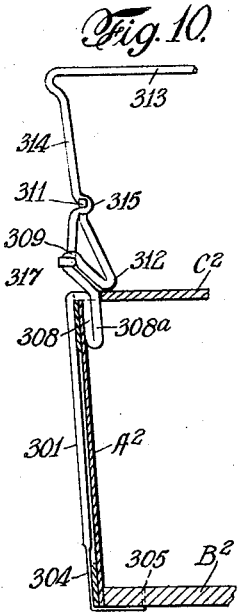
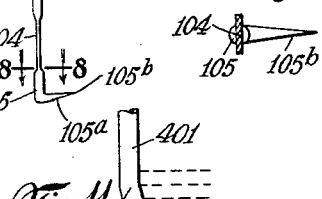
INVENTOR
Ralph P. Young
BY
Louis Prevost Whitaker
ATTORNEY Sept. 22, 1931.  R. P. YOUNG  1,824,319
HANDLE FOR WOODEN BASKETS
Filed April 23, 1927   2 Sheets-Sheet 2
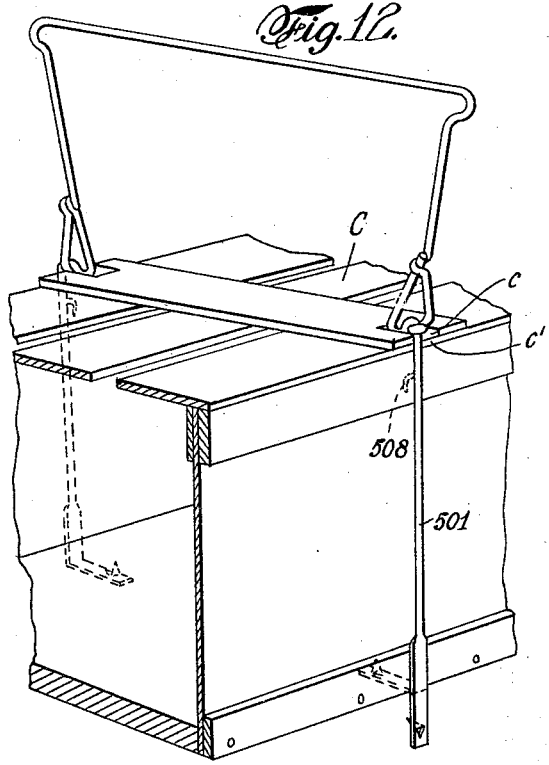
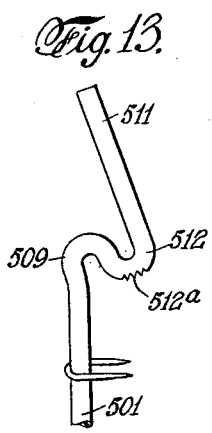
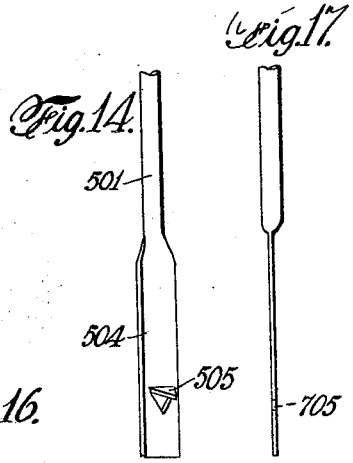
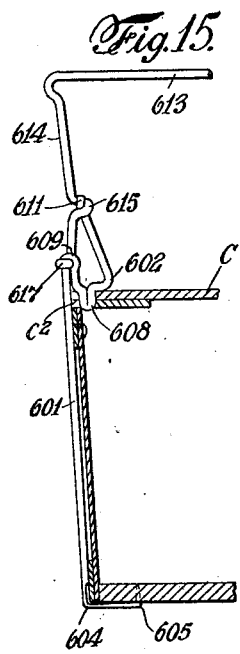
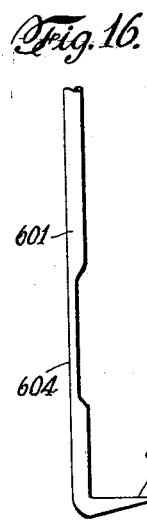
Ralph P. Young INVENTOR
BY Louis Prevost Whitaker ATTORNEY Patented Sept. 22, 1931

1,824,319

UNITED STATES PATENT OFFICE

RALPH P. YOUNG, OF MARLBORO, NEW YORK

HANDLE FOR WOODEN BASKETS

Application filed April 23, 1927. Serial No. 185,960.

My invention consists in the novel features hereinafter described, reference being had to the accompanying drawings which show several forms in which I have contemplated embodying my invention, and the said invention is fully disclosed in the following description and claims.

The object of my invention is to provide a metallic handle for wooden baskets of the kind ordinarily used for holding and transporting grapes and other fruits, vegetables, etc., and is an improvement on the handle set forth in U. S. Letters Patent No. 1,571,551, granted February 2, 1926, to H. W. Kramer. My present invention consists of certain novel constructions and combinations of parts whereby the handle can be more readily attached to the baskets and used therewith with special reference to accomodating variations in the height of the basket sides, which are found to exist in the baskets as commercially produced, and to facilitate the application of the cover, and the locking of it in closed position on the basket.

Referring to the accompanying drawings,

Fig. 1 represents a perspective view partly in section of a portion of a basket showing the preferred form of handle attached thereto in operative position and holding the cover against accidental displacement, the position of the cover in placing the same upon the basket being illustrated in dotted lines.

Fig. 2 represents a side view of one of the side pieces of the handle before it is attached to the basket, showing in dotted lines the position of the parts thereof after the side pieces are attached to the basket.

Fig. 3 is a front elevation of the side piece illustrated in Fig. 2.

Fig. 4 represents a horizontal section on the line 4—4 of Fig. 2, somewhat enlarged.

Fig. 5 represents a similar section on the line 5—5 of Fig. 2.

Fig. 6 represents a modified form of the side piece showing the manner in which the point which engages the bottom is bent laterally.

Figs. 7 and 8 represent horizontal sections of Fig. 6, on the lines 7—7 and 8—8 respectively.

Fig. 9 represents a partial sectional view of a basket and handle showing a slight modification in which the upper impaling point of the side piece is omitted.

Fig. 10 is a similar view showing another slightly modified form of the invention.

Fig. 11 represents the lower portion of a side piece, showing another slight modification thereof.

Fig. 12 is a view similar to Fig. 1, showing a slightly modified form of side member.

Fig. 13 is a detail of the upper end of a side member, adapted to be secured by a staple.

Fig. 14 is a perspective view of the lower portion of the side member shown in Fig. 12, somewhat enlarged.

Fig. 15 is a view similar to Fig. 9, showing another slightly modified form of handle.

Fig. 16 represents an enlarged view of the lower end of the side member shown in Fig. 6.

Fig. 17 is a similar view showing a slight modification.

The wooden baskets for which my improved handle is intended, are manufactured commercially at factories located at various points more or less remote from the points where the baskets are packed and shipped. The handles, which are preferably formed of metal wire, preferably iron or steel, comprise three members, two side members adapted to be permanently secured to the sides of the basket midway between the ends thereof, and a detachable bail member. While the handles may be purchased by the consumer separately from the basket and attached thereto, it is desirable that they be furnished to the manufacturer of the baskets, and that the side members be permanently attached to the baskets before shipment. As the bail members are detachable the baskets, after the adjustment of the side pieces, may be nested and shipped to the consumer with an appropriate quantity of lids or covers, and under ordinary circumstances the bail members will be attached to the side members to complete the handle, so that the baskets may be supported by the bail member while they are being packed or filled, after which the covers are placed in closed position to protect the contents and the filled baskets are shipped to the market. The side members of the handle as hereinafter described, are provided with inwardly extending shoulders, which extend above the upper edge of the basket at a sufficient distance (preferably less than the thickness of the cover) to engage recesses in the cover and hold it against accidental displacement. It is found in practice that these baskets, which usually comprise a solid wooden bottom, indicated at B, vertically disposed side pieces, indicated at A, and binding strips of wood veneer, illustrated at $a$, $a^1$ and $a^2$ (see Fig. 1), vary materially in the vertical height of the sides, due at least in part to the variations in the thickness of the material of which the bottom, B, is formed, this variation being sometimes as great as from ⅛ of an inch to ¼ of an inch, and as the cover retaining shoulder of the side pieces must of necessity extend inwardly at exactly the desired distance above the upper of the side to accommodate the cover, indicated at C in Fig. 1, and as it is desirable that the side pieces shall extend beneath the bottom of the basket and be secured thereto in order that the handle may be secured properly to the bottom to support the contents, and unless some means is provided for accommodating this variation in the height of the basket sides, it would be necessary to make the side pieces in a variety of lengths which would greatly increase the cost of production.

In carrying out my invention, I form the side member, indicated at 1, preferably of round wire and provided adjacent to its upper end with an inward and downward bend, indicated at 9, to form a locking portion, and a cover retaining shoulder, 12, roughened as at $12^a$, Figs. 2 and 13, the upper end of the side member being bent upwardly from the shoulder, 12, forming a guiding portion, indicated at 11. The upper portion of the side member, 1, is provided with means for attaching it to the upper edge of the basket. This may be a staple, as shown in Fig. 13, but consists preferably of an impaling point, indicated at 8, which is formed by shearing it from the metal of the side piece and bending it outwardly, as indicated in Figs. 2 and 3, the recess formed in the side piece from which the point, 8, is cut, being indicated at $8^a$. Where this type of impaling point is employed in accordance with my invention, I make this shear cut in an upward direction, as shown in Figs. 2 and 3, so that the metal stock in the portion indicated at $1^a$, above the impaling point, shall be of the full thickness and strength of the rod or wire from which the side pieces are made. This is very important, as the upper portions of the side piece extend above the edge of the basket and may occasionally receive a knock in handling or transportation. This is particularly true of the topmost basket of a nest, and if the impaling point were cut by a downward stroke so that the reduced portion of the stock, indicated at $8^a$, were above the impaling point, the upper end of the side piece would in many instances be broken off, and this is entirely prevented by cutting the impaling point from the stock of the side piece below the same, as shown in Figs. 1, 2 and 3. I also prefer, according to my present invention, to cut the impaling point on the side of the stock toward the basket, so that when the point is bent out into a horizontal position, it will be directly in line with the shoulder, 12, as indicated in Fig. 3. It follows from this construction that when the impaling point is pressed through the wood of the basket side in the direction of the arrow in Fig. 4, the apex, $8^b$, of the impaling point will be in alignment with the center of the side piece, and the sides of the point will extend therefrom equally on both sides of said center, so that there will be no tendency for the point to twist, and it can easily be pressed straight through the basket side, either by hand or by suitable machine.

The lower end of the side piece, 1, is provided with a flattened portion, indicated at 4, parallel to the plane of the basket side and extending a considerable distance below the bottom edge, where it is provided with means for attaching it to the bottom of the basket, as an inwardly extending impaling point, indicated at 5, which may be formed by shearing or cutting away the extremities of the flattened portion, 4, as indicated, for example, in Fig. 5. I prefer to so construct the side piece that the flattened portion, 4, will be readily bent at any point vertically thereof over the bottom edge of the basket, as indicated in Fig. 1 and in Fig. 2 in dotted lines, according to the vertical height of the particular basket to which it is applied, thus forming a bend, indicated at 6, in Figs. 1 and 2, and swinging the impaling point, 5, into a substantially vertical position, so that it is easily driven upward into the bottom B, of the basket. The desired ductility of the flattened portion, 4, may be obtained by annealing if necessary, or by forming this flattened portion sufficiently thin in any desired way to be easily bent around the bottom edge of the basket.

In applying the side piece to the basket, it will be so placed as to bring the shoulder, 12, a distance above the upper edge of the basket side, preferably slightly less than the thickness of the cover, C, the flattened piece, 4, being brought into engagement with the lower portion of the side, A, of the basket, and extending downward below the same, as indicated in dotted lines in Fig. 1. The impaling point, 8, is then pressed through the upper portions of the basket side and clinched, and it is to be noted that the engagement of the flattened portion, 4, with the flat side of the basket, as the binding strip, a, Fig. 1, will assist in preventing the impaling point from twisting as it is pressed through the upper portion of the basket side, thus bringing the shoulder, 12, in proper relation to the side of the basket. After the point, 8, is clinched, the downwardly projecting part of the flattened portion, 4, will be bent inwardly, as indicated by the curved dotted line, x, in Fig. 1, to form the bend, 6, which will be made obviously at exactly the lower corner of the basket regardless of any variation in the height of the side piece. The impaling point, 5, is then driven up into the bottom, B, of the basket.

It will thus be seen that the side pieces can be made in accordance with my invention, so as to accommodate any variations in the height of the basket sides which may occur in the commercial manufacture of the baskets, without in any way affecting the relation between the shoulder, 12, and the upper edge of the basket. The only difference that would be caused would be that the distance of the impaling point from the outer side of the basket would vary in accordance with the variations in the height of the side, and this is important. The side members, 1, can therefore be made of uniform size for any particular size of basket, and will accommodate the variations in the height of the sides of different baskets and also variations in the height of the same basket, without in any way interfering with the operativeness of the handle or of the shoulders, 12, in holding the cover in place.

It will be understood that each basket is provided with two of these side pieces, and the handle is completed by a bail member having a hand engaging portion, 13, and downwardly extending arms, 14, 14, which are provided with guiding portions, 15, in the form of loops, and locking portions, 17, below the same, and connections thereto by the intervening portions, 16, the guiding portions, 15, being placed in engagement with the guiding portions, 11, of the side pieces, and the locking portions, 17, being made to engage the locking bends, 9, of the side members, and thereby permanently locking the handle to the side members and basket, and holding it in a vertical position. As the bail member is usually attached to the side members and basket while the latter is being filled, I prefer to form the bail member with outwardly extending bends or loop portions, indicated at 20, in Fig. 1, so as to make the bail member wider at the upper portion adjacent to the hand engaging member, 13. This forms a recess, 20$^a$, at each side of the bail to receive one edge of the cover, C, as indicated in dotted lines in Fig. 1, when the cover is to be inserted, the other edge being beneath the shoulder, 12, at the opposite side of the basket, so that the cover can be slid longitudinally through the bail without engaging the contents of the basket until it is in the proper position longitudinally thereof, when the raised edge can be forced down beneath the shoulder, 12, of the side piece on the adjacent side of the basket, by slightly springing the cover, the shoulders, 12, preferably engaging notches or recesses, c, in the cover.

In Figs. 6, 7, and 8, I have illustrated a slight modification of the side piece, in which corresponding parts are given the same reference numerals with the addition of 100, to avoid repetition. In this modified form the flattened portion, 104, does not extend to the extreme end of the side member, leaving a rounded portion, 105, below the same, which is sheared off at one side, as at 105$^a$, and bent laterally as indicated in full lines in Fig. 6, to form the lower impaling point, 105$^b$, to be forced upwardly into the bottom of the basket after the bend has been made in the flattened portion, 104, at the proper point. In this instance the upward impaling point, 108, is also cut from the stock by an upward cut, leaving the flattened portion, 108$^a$, below the same, but the cut in this instance is made perpendicular to the side of the basket, and the point, 108, is bent laterally in a horizontal position, and therefore extends entirely at one side of the center of the stock, as clearly indicated in Fig. 7. This is an entirely practical construction, especially in view of the fact that the flattened portion, 104, engaging the side of the basket when the impaling point is forced inward through the basket side, tends to prevent the point, 108, from twisting, but I prefer the construction illustrated in Figs. 2, 3 and 4. The side member, 101, operates exactly as heretofore described, and the flattened portion, 104, which is easily bendable, will enable it to accommodate the variations in the height of the basket side.

In Fig. 9 I have shown another modification of the side piece, in which the corresponding reference numerals are used, with the addition of 200, to avoid repetition. In this construction, the side member, indicated at 201, is provided at its lower end with the flattened portion, 204, and impaling point, 205, constructed and operating as before described. The upper end of the side member, however, is in this instance shown provided with means for engaging the upper edge of the basket, so as to bring the basket retaining shoulder, indicated at 212, in the proper position without the use of an upper impaling point. In this instance the side member, 201, is extended slightly above the top of the basket, and is bent sharply upon itself to form the locking loop, 209, and has a downwardly extending portion, 208, extending below the top of the basket, parallel to the main body of the side member and at a distance therefrom sufficient to clamp the side member, and forming a shoulder, $208^a$, to engage the upper edge of the side of the basket, herein indicated at $A^1$. The stock of the side member is then bent sharply back from the portion, 208, as indicated at $208^b$, then inwardly to form the shoulder, 212, in proper position to engage the cover, $C^1$, and then upwardly to form the guiding portion, 211, in proper relation to the locking loop, 209. In attaching this side piece, it is pressed into firm engagement with the top edge of the basket, while the flattened portion, 204, extends below the bottom, as indicated in full lines in Fig. 9, after which the bend, 206, is made at the proper point in the flattened portion, 204, according to the height of the basket side and the impaling point, 205, secured to the bottom, B′. The bail member is constructed substantially as shown and described with reference to Fig. 1, and operates in the same manner.

In Fig. 10 I have shown another slight modification of my invention, in which the corresponding parts shown in Figs. 1 to 5 are given the same reference numerals with the addition of 300, to avoid repetition. In this case the side member, 301, is provided with the flattened portion, 304, and impaling point, 305, constructed and operating as previously described. The upper portion of the side member is bent sharply downward to provide a clamping portion, 308, and is then bent upwardly, as at $308^a$, and outwardly to form the locking loop 309, thence downwardly to form the cover engaging shoulder, 312, to engage the cover, $C^2$, and thence upwardly to provide the guiding portion, 311. The bail member is formed in the manner previously described, and cooperates with this type of side member in the same manner.

In Fig. 11, I have shown another slight modification of the side member, in which the lower end of the same, here indicated at 401, is provided with a partial bend, indicated at 404, above the impaling point, indicated at 405, but without positively flattening the side member at this point. I have found in practice that by giving the lower end of the side member a partial bend, as indicated in Fig. 11, it is possible to bend it finally beneath the bottom of the basket at different points longitudinally, indicated by the several dotted lines in Fig. 11, and that it will so bend much more readily than would be the case if the partial bend had not been first imparted to it. It is also to be understood that I may form the side pieces without flattening them adjacent to the bottom of the basket, and provide them with readily bendable portions adjacent thereto, either by using a soft wire, or by annealing the portions of the wire adjacent to the bottom edge of the basket, or by employing a wire of smaller diameter, either with or without annealing. In any case the lower end of the side piece as formed will extend a distance below the bottom of the basket, and the portion adjacent to the bottom of the basket will be readily bendable, so that it can be bent around and beneath the basket bottom, at the time it is applied to the basket, and secured thereto, so as to accommodate the inevitable variations in the height of the basket sides.

In Fig. 12 I have shown a slightly modified form of my invention, in which the parts of the handle corresponding with those shown in Fig. 1 are given the same numerals with the addition of 500. In this figure the bail member is formed exactly as in Fig. 1. The side members, 501, have their upper ends secured to the sides of the basket by the points, 508. The lower end portions are flattened, as at 504, and are readily bendable around the lower edge of the basket, and the part which engages the basket bottom is shown provided with a struck up point, 505, formed by punching out a part of the flattened portion, as indicated in Fig. 14. In this figure, as in Fig. 1, the cover retaining shoulders, 512, extend into recesses, $c$, at each side of the cover, which do not extend entirely through the cover. Where the cover is made of slats and cross pieces, this is readily arranged by forming the recesses in the cross pieces, $C'$, as shown, but where the cover is of one piece, the recesses may be formed of less depth than the cover. In either case the engagement of the shoulders, 12, with the recesses, $c, c$, will prevent endwise movement of the cover as well as prevent the cover from being lifted vertically, and the solid edge portions of the cover, indicated at $c'$, in Figs 1 and 12, will engage the inner faces of the side members and hold them a predetermined distance apart, thus preventing the side pieces from being pulled inwardly and crushing the contents of the basket.

In some instances it may be desirable to cut these lateral recesses all the way through the cover, as indicated at $c^2$, Fig. 15. In such case, each of the side members, here indicated at 601, is provided with the locking portion, 609, and with a downwardly extending projection, 608, to engage the recess, $c^2$, and a shoulder, 612, adjacent thereto, to engage the top of the cover. In this instance the solid portions of the cover at the inner edges of the recesses, $c^2$, engage the projections, 608, and prevent the sides of the basket from being pressed inwardly when the filled basket is lifted.

In Figs. 15 and 16, I have shown the lower end of the side member provided with a readily bendable portion, 604, formed by cutting away portions of the side member above and below the lower edge of the basket, so that it can be bent around said edge at the time of attachment, to accommodate the variations in the height of the basket sides.

The form of my invention in which the upper ends of the side pieces are provided with a clip to grip the upper edge of the basket, in connection with a bendable lower portion is not specifically claimed herein, as the same is claimed in another application filed by me on the 28th day of December 1928, and given Serial No. 328,939, which is a continuation of this application as to all matters common to both.

It will be understood that while I prefer to provide the side members with the integral points for engaging the side and bottom of the basket, they may be secured to the basket by other means. For example, they may be secured to the upper portion of the basket by staples, as indicated in Fig. 13, as the flattened lower portion, and its retaining means will hold the side member in proper position, and the bottom end portion may be provided with an aperture, 705, for example, as shown in Fig. 17, in which the side member is indicated at 701, and the flattened, easily bendable lower portion is indicated at 704, so that when the part, 704, is bent around the bottom edge of the basket the terminal portion may be secured in position by a nail or screw driven through the aperture, 705.

What I claim and desire to secure by Letters Patent is:—

1. A handle structure for baskets comprising metallic side members, each provided in its upper portion with a basket side empaling point formed by shearing a portion of said side member upwardly in a plane disposed longitudinally of the basket side and inclining upwardly and outwardly therefrom and bending the point so formed into substantially horizontal position substantially perpendicular to the plane of the shear, the lower portion of each side member extending below the bottom edge of the basket and being sufficiently yielding to enable it to be bent easily around the lower edge of the basket after said impaling point is attached to the upper portion of the basket side, to accommodate variations in the height of the basket sides, and means for securing the bottom engaging portion of each side member thereto after it is bent into engagement therewith.

2. A handle element for wooden baskets, comprising a rod-like member having lid engaging means at one end thereof, basket engaging and holding means adjacent thereto, basket holding and engaging means at the other end, said rod-like member being specially prepared adjacent the latter means for bending.

3. In a veneer basket having a relatively narrow reinforcing strip secured around the upper edge to the veneer, of a handle element comprising a rod-like member having a bale engaging part, means adjacent the bale engaging part for engaging the reinforcing strip and securing the upper end of said member to the basket, basket holding and engaging means at the other end of said member, said rod-like member being specially adjacent the latter means for bending around the lower edge of the basket so as to accommodate variations in the height of the basket sides.

4. A handle structure for wooden baskets including a hand engaging portion, and a pair of side pieces, for attaching to the basket each of said side pieces, comprising a rod-like member, provided with integral lid engaging means and integral securing means in fixed relation thereto for securing the side piece to the upper portion of the basket side, and positioning said cover engaging means, said side piece being provided adjacent to its lower end with integral securing means for engaging the lower face of the basket bottom, and having portions adjacent said last mentioned securing means specially prepared for bending in situ around the lower edge of the basket side to accommodate variations in the height of the basket sides.

In testimony whereof I affix my signature.

RALPH P. YOUNG.